US012367350B2

(12) United States Patent
Zhang et al.

(10) Patent No.: US 12,367,350 B2
(45) Date of Patent: Jul. 22, 2025

(54) RANDOM ACTION REPLAY FOR REINFORCEMENT LEARNING

(71) Applicant: International Business Machines Corporation, Armonk, NY (US)

(72) Inventors: Wei Zhang, Littleton, MA (US); Murray Scott Campbell, Yorktown Heights, NY (US); Yang Yu, Acton, MA (US); Sadhana Kumaravel, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 576 days.

(21) Appl. No.: 16/946,586

(22) Filed: Jun. 29, 2020

(65) Prior Publication Data

US 2021/0406689 A1 Dec. 30, 2021

(51) Int. Cl.
| | |
|---|---|
| G06N 20/00 | (2019.01) |
| G06F 18/214 | (2023.01) |
| G06F 40/284 | (2020.01) |
| G06F 40/35 | (2020.01) |
| G06F 40/56 | (2020.01) |
| G06N 3/082 | (2023.01) |

(52) U.S. Cl.
CPC ............ *G06F 40/35* (2020.01); *G06F 18/214* (2023.01); *G06F 40/284* (2020.01); *G06F 40/56* (2020.01); *G06N 3/082* (2013.01)

(58) Field of Classification Search
CPC .......... G06N 3/082; G06N 3/006; G06N 3/08; G06F 40/56; G06F 40/284; G06F 40/35; G06F 18/214; G06F 18/2413; G06K 9/6256

USPC ......................................................... 706/25
See application file for complete search history.

(56) References Cited

U.S. PATENT DOCUMENTS

| | | | |
|---|---|---|---|
| 9,480,908 B2 | 11/2016 | Brown et al. | |
| 9,679,258 B2 * | 6/2017 | Mnih | ..................... G06N 3/006 |
| 10,204,097 B2 | 2/2019 | Lipton et al. | |
| 10,510,000 B1 * | 12/2019 | Commons | .............. G06N 3/045 |

(Continued)

FOREIGN PATENT DOCUMENTS

EP 2381393 10/2011

OTHER PUBLICATIONS

Wen, Tsung-Hsien, et al. "Multi-domain neural network language generation for spoken dialogue systems." arXiv preprint arXiv: 1603.01232 (2016) (Year: 2016).*

(Continued)

*Primary Examiner* — Andrew T McIntosh
(74) *Attorney, Agent, or Firm* — Steven M. Bouknight

(57) ABSTRACT

An artificial intelligence (AI) platform to support random action replay for natural language (NL) learning. A NL conversation is subject to exploration to train a neural network. One or more tuples are leveraged for the training, with each tuple representing an input action, a vector, an output action, and a reward value. An action is sampled from the vector, with the sampling configured to assess a corresponding first gradient. The first gradient is applied to selectively adjust the neural network. As NL input is received and applied to the selectively adjusted neural network, an output corresponding to the NL input is identified and a corresponding action is subject to be executed.

17 Claims, 8 Drawing Sheets

(56) References Cited

U.S. PATENT DOCUMENTS

| | | | |
|---|---|---|---|
| 11,715,042 B1* | 8/2023 | Liu | G06N 3/006 705/26.1 |
| 2017/0330556 A1* | 11/2017 | Fatemi Booshehri | G10L 25/51 |
| 2018/0300317 A1 | 10/2018 | Bradbury | |
| 2019/0115027 A1* | 4/2019 | Shah | G10L 17/22 |
| 2019/0362074 A1 | 11/2019 | Wang et al. | |
| 2020/0012953 A1 | 1/2020 | Sun et al. | |
| 2020/0143247 A1* | 5/2020 | Jonnalagadda | G06N 3/044 |
| 2021/0019642 A1* | 1/2021 | O'Malia | G06F 40/279 |
| 2021/0232922 A1* | 7/2021 | Zhang | G06F 18/214 |
| 2021/0272559 A1* | 9/2021 | Medalion | G10L 15/197 |
| 2022/0036884 A1* | 2/2022 | Ramachandran | G06F 18/217 |
| 2022/0103891 A1* | 3/2022 | Xu | H04N 21/2187 |

OTHER PUBLICATIONS

Cerisara, Christophe, Pavel Kral, and Ladislav Lenc. "On the effects of using word2vec representations in neural networks for dialogue act recognition." Computer Speech & Language 47 (2018): 175-193 (Year: 2018).*

Liu, Bing, and Ian Lane. "Iterative policy learning in end-to-end trainable task-oriented neural dialog models." 2017 IEEE Automatic Speech Recognition and Understanding Workshop (ASRU). IEEE, 2017 (Year: 2017).*

Prollochs, N., et al., "Reinforcement Learning in R", University of Oxford, Oct. 31, 2018.

Mnih, V., et al., "Playing Atari with Deep Reinforcement Learning", arXiv: 1312.5602v1, Dec. 19, 2013.

Schaul, T., et al., "Prioritized Experience Replay", ICLR 2016, arXiv: 1511.05952v4, Feb. 25, 2016.

Wang, Z., et al., "Sample Efficieny Actor-Critic With Experience Replay", ICLR 2017, arXiv: 1611.01224v2, Jul. 10, 2017.

Foerster, J., et al., "Stabilising Experience Replay for Deep Multi-Agent Reinforcement Learning", Proceedings of the 34th International Conference on Machine Learning, PMLR 70, 2017, arXiv: 1702.08887v3, May 21, 2018.

Liang, C., et al.. "Memory Agumented Policy Optimization for Program Synthesis and Semantic Parsing", 32nd Conference on Neural Information Processing Systems (NeurIPS 2018), arXiv: 1807.02322v5, Jan. 13, 2019.

Abadi, M., et al., "TensorFlow: A System for Large-Scale Machine Learning", 12th USENIX Symposium on Operating Systems Design and Implementation (OSDI '16), pp. 265-283, Nov. 2-4, 2016.

Andrews, M., et al., "Integrating Experiential and Distributional Data to Learn Semantic Representations", Psychological Review 2009, vol. 116, No. 3, pp. 463-498.

Busoniu, L., et al., "A comprehensive survey of multi-agent reinforcement learning", IEEE Transactions on Systems, Man, and Cybernetics, Part C: Applications and Reviews, vol. 38, No. 2, pp. 156-172, Mar. 2008.

Church, K. W., et al., "Word Association Norms, Mutual Information and Lexicography", Computational Linguistics, 16(1), pp. 22-29, Mar. 1990.

Das, A., et al., "Learning Cooperative Visual Dialog Agents with Deep Reinforcement Learning", IEEE International Conference on Computer Vision (ICCV), pp. 2951-2960, 2017.

De Deyne, S., et al., "Predicting Human Similarity Judgments with Distributional Models: The Value of Word Associations", Proceedings of the Twenty-Sixth International Joint Conference on Artificial Intelligence (IJCAI-17), pp. 4806-4810, 2017.

De Vries, H., et al., "GuessWhat?! Visual object discovery through multi-modal dialogue", Proceedings of the IEEE Conference on Computer Vision and Pattern Recognition, pp. 5503-5512, 2017.

Foerster, J. N., et al., "Learning to Communicate with Deep Multi-Agent Reinforcement Learning", Advances in Neural Information Processing Systems, pp. 2137-2145, 2016.

Foerster, J. N., et al., "Counterfactual Multi-Agent Policy Gradients", 32nd AAAI Conference on Artificial Intelligence, 2018.

Frank, M. C., "Predicting Pragmatic Reasoning in Language Games", Science, vol. 336, pp. 998-998, May 25, 2012.

Ghazvininejad, M., et al., "A Knowledge-Grounded Neural Conversation Model", 32nd AAAI Confernce on Artificial Intelligence (AAAI-18), pp. 5510-5517, 2018.

Havrylov, S., et al., "Emergence of Language with Multi-agent Games: Learning to Communicate with Sequences of Symbols", Advances in Neural Information Processing Systems, pp. 2149-2159, 2017.

He, H., et al., "Learning Symmetric Collaborative Dialogue Agents with Dynamic Knowledge Graph Embeddings", arXiv: 1704.0713v1, Apr. 24, 2017.

Hinton, G., et al., "Neural Networks for Machine Learning", Lecture 6a, Overview of mini-batch gradient descent, Feb. 5, 2016.

Hu, H., et al., "Playing 20 Question Game with Policy-Based Reinforcement Learning", arXiv:1808.07645v3, Jun. 24, 2019.

Lazardou, A., et al., "Multi-Agent Cooperation and the Emergence of (Natural) Language", arXiv: 1612.01782v2, Mar. 5, 2017.

Levin, J. A., et al. "Dialogue-games: Metacommunication Structures for Natural Language Interaction", Cognitive Science, 1(4), pp. 395-420, 1977.

Li, J., et al., "Deep Reinforcement Learning for Dialogue Generation", Proceedings of the 2016 Conference on Empirical Methods in Natural Language Processing, pp. 1192-1202, arXiv: 1606.01541v4, Sep. 29, 2016.

Lowe, R., et al., "Multi-Agent Actor-Critic for Mixed Cooperative-Competitive Environments", 31st Conference on Neural Information Processing Systems (NIPS 2017).

Lowe, R., et al., "Training End-to-End Dialogue Systems with the Ubuntu Dialogue Corpus", Dialogue & Discourse 8(1), pp. 31-65, 2017.

Mordatch, I., et al., "Emergence of Grounded Compositional Language in Multi-Agent Populations", 32nd AAAI Conference on Artificial Intelligence, arXiv: 1703.04908v2, Jul. 24, 2018.

Narasimhan, K., et al., "Language Understanding for Text-based Games using Deep Reinforcement Learning", Proceedings of the 2015 Conference on Empirical Methods in Natural Language Processing, Sep. 2015.

Nelson, D. L., et al., "The University of South Florida Word Association, Rhyme and Word Fragment Norms", Behavior Research Methods, Instruments & Computers, 36(3), pp. 40-407, 1998.

Omidshafiei, S., et al., "Deep Decentralized Multi-task Multi-Agent Reinforcement Learning under Partial Observability", Proceedings of the 34th International Conferene on Machine Learning, 2017, arXiv: 1703.06182v4, Jul. 13, 2017.

OpenAI Five, https://openai.com/blog/openai-five/, Jun. 25, 2018.

Pincus, E., et al., "Towards Automatic Identification of Effective Clues for Team Word-Guessing Games", Proceedings of the Tenth International Conference on Language Resources and Evaluation (LREC'16), European Language Resources Association (ELRA), pp. 2741-2747, May 2016.

Rubin, D. C., et al., "Predicting which words get recalled: Measures of free recall, availability, goodness, emotionality, and pronunciability for 925 nouns", Memory & Recognition, 14(1), pp. 79-94, 1986.

Serban, J. V., et al., "Building end-to-end dialogue systems using generative hierarchical neural network models", AAAI '16: Proceedings of the 30th AAAI Conference on Artificial Intelligence, pp. 3776-3783, Feb. 2016.

Silver, D., et al., "Mastering the game of Go with deep neural networks and tree search", Nature 529, pp. 484-489, 2016.

Speer, R., et al., "ConceptNet 5.5: An Open Multilingual Graph of General Knowledge", 31st AAAI Conference on Artificial Intelligence, arXiv:1612.03975v2, Dec. 11, 2018.

Sukhbaatar, S., et al., "Learning multiagent communication with backpropagation" NIPS'16: Proceedings of the 30 International Conference on Neural Information Processing Systems, pp. 2252-2260, Dec. 2016.

Sutton, R.S., et al., "Policy Gradient Methods for Reinforcement Learning with Function Approximation", Advances in Neural Information Processing Systems, pp. 1057-1063, 2000.

https://www.hasbro.com/common/instruct/Taboo(2000).pdf, Accessed: Mar. 10, 2019.

(56) References Cited

OTHER PUBLICATIONS

Vinyals, O., et al., "A Neural Conversation Model", Proceedings of the 31st International Conference on Machine Learning, arXiv: 1506.05869v3, Jul. 22, 2015.
Von Ahn, L., et al., "Designing games with a purpose", Communications of the ACM, vol. 51, Issue 8, Aug. 2008.
Wen, T-H., et al., "A Network-based End-to-End Trainable Task-oriented Dialogue System", arXiv:1604.04562v3, Apr. 24, 2017.
Williams, Ronald, J., "Simple Statistical Gradient-Following Algorithms for Connectionist Reinforcement Learning", Machine Learning, 8, pp. 229-256, 1992.
Wu, Chien-Sheng, et al., "Global-to-Local Memory Pointer Networks for Task-Oriented Dialogue", arXiv:1901.04713v2, Mar. 29, 2019.
Young, S., et al., "POMDP-based Statistical Spoken Dialogue Systems: a Review", Proceedings of the IEEE, vol. 101, Issue 5, pp. 1160-1179, May 2013.
Young, T., et al., "Augmenting End-to-End Dialogue Systems with Commonsense Knowledge", arXiv: 1709.05453v3, Feb. 12, 2018.
Zhou, H., et al., "Commonsense Knowledge Aware Conversation Generation with Graph Attention", Proceedings of the Twenty-Seventh International Joint Conference on Artificial Intelligence (IJCAI-18), pp. 4623-4629, 2018.

\* cited by examiner

RANDOM ACTION REPLAY FOR REINFORCEMENT LEARNING

BACKGROUND

The present embodiments relate to training a neural network for natural language processing. More specifically, the embodiments relate to populating replay buffers with tuples generated during agent interactions, and leveraging the tuples to train a corresponding neural network.

SUMMARY

The embodiments include a system, computer program product, and method for training a neural network for natural language processing.

In one aspect, a computer system is provided with a processing unit operatively coupled to memory, and an artificial intelligence (AI) platform operatively coupled to the processing unit. The AI platform supports random action replay for natural language (NL) learning. The AI platform includes tools in the form of a training manager and a language manager. The training manager functions to train a neural network. The training manager explores a NL conversation to leverage one or more tuples. Each tuple represents an input action, a vector, an output action, and a reward value. The training manager samples a first action from the vector and assesses the sampled first action to calculate a first gradient representing a distance of the sampled action from the vector. The first gradient is applied to selectively adjust the neural network. The language manager, which is operatively coupled to the training manager, receives and applies NL input to the selectively adjusted neural network to identify an output corresponding to the NL input. The language manager executes an identified action corresponding to the identified output.

In another aspect, a computer program product is provided to support random action replay for natural language (NL) learning. The computer program product includes a computer readable storage medium having program code embodied therewith. Program code, which is executable by a processor, is provided to train a neural network. The program code explores a NL conversation to leverage one or more tuples. Each tuple represents an input action, a vector, an output action, and a reward value. The program code samples a first action from the vector and assesses the sampled first action to calculate a first gradient representing a distance of the sampled action from the vector. The first gradient is applied to selectively adjust the neural network. NL input is received and applied to the selectively adjusted neural network to identify an output corresponding to the NL input. The program code executes an identified action corresponding to the identified output.

In yet another aspect, a method is provided to support random action replay for natural language (NL) learning. The method includes training a neural network. A NL conversation is explored to leverage one or more tuples. Each tuple represents an input action, a vector, an output action, and a reward value. A first action is sampled from the vector and the sampled first action is assessed to calculate a first gradient representing a distance of the sampled action from the vector. The first gradient is applied to selectively adjust the neural network. NL input is received and applied to the selectively adjusted neural network to identify an output corresponding to the NL input. An identified action corresponding to the identified output is executed.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein forms a part of the specification. Features shown in the drawings are meant as illustrative of only some embodiments, and not of all embodiments, unless otherwise explicitly indicated.

DETAILED DESCRIPTION

Figure 1:
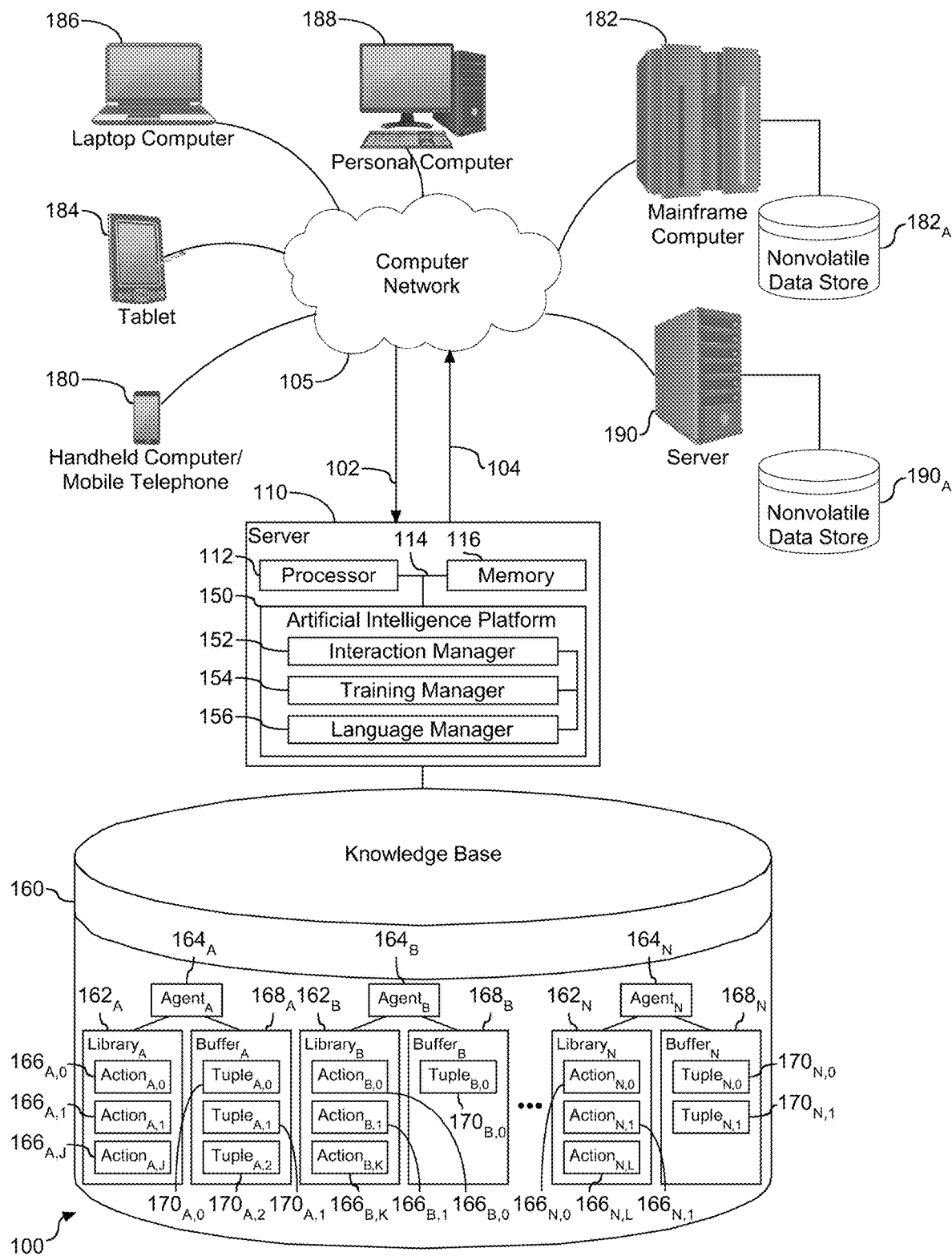
FIG. 1 depicts a schematic diagram of a computer system to support and enable training a neural network for natural language processing.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a dataset to solve problems and provide relevant recommendations. For example, in the field of artificial intelligent computer systems, natural language systems (such as the IBM Watson® artificially intelligent computer system or other natural language interrogatory answering systems) process natural language based on system-acquired knowledge. To process natural language, the system may be trained with data derived from a database or corpus of knowledge, but the resulting outcome can be incorrect or inaccurate for a variety of reasons.

Machine learning (ML), which is a subset of Artificial Intelligence (AI), utilizes algorithms to learn from data and create foresights based on this data. AI refers to the intelligence when machines, based on information, are able to make decisions, which maximizes the chance of success in a given topic. More specifically, AI is able to learn from a dataset to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

Referring to FIG. 1, a schematic diagram of a computer system (100) is provided with tools to train a neural network for natural language processing. As shown, a server (110) is provided in communication with a plurality of computing devices (180), (182), (184), (186), (188), and (190) across a network connection (105). The server (110) is configured with a processor (112) in communication with memory (116) across a bus (114). The server (110) is shown with an artificial intelligence (AI) platform (150) to support training a neural network for natural language processing. More specifically, the AI platform (150) is configured with one or more tools to populate the replay buffers with tuples generated during agent interactions, and to leverage the tuples to train a corresponding neural network. The computing devices (180), (182), (184), (186), (188), and (190) communicate with each other and with other devices or components via one or more wired and/or wireless data communication links, where each communication link may comprise one or more of wires, routers, switches, transmitters, receivers, or the like. Other embodiments of the server (110) may be used with components, systems, sub-systems, and/or devices other than those that are depicted herein.

The artificial intelligence (AI) platform (150) is shown herein configured to receive input (102) from various sources. For example, the AI platform (150) may receive input, such as actions or terms, across the network (105) from one or more of the plurality of computing devices (180), (182), (184), (186), (188), and (190). Furthermore, and as shown herein, the AI platform (150) is operatively coupled to a knowledge base (160) populated with libraries ($162_A$), ($162_B$), and ($162_N$), with each library having corresponding actions and/or terms. Accordingly, the AI platform (150) may receive input across the network (105) or from the knowledge base (160).

The input, e.g. actions and terms, are leveraged to train a neural network for natural language processing, as shown and described below. Each library is associated with a corresponding neural network adapted for NL processing. The neural networks are individually referred to herein as an agent. As shown, library$_A$ ($162_A$) is associated with Agent$_A$ ($164_A$), library$_B$ ($162_B$) is associated with Agent$_B$ ($164_B$), and library$_N$ ($162_N$) is associated with Agent$_N$ ($164_N$). The quantity of libraries ($162_A$), ($162_B$), and ($162_N$) is for illustrative purposes and should not be considered limiting.

Each library, ($162_A$), ($162_B$), and ($162_N$) is shown containing a distribution of actions, which in an embodiment are referred to here as a first distribution of terms. As shown, library$_A$ ($162_A$) is shown with a plurality of actions, shown herein by way of example as action$_{A,0}$ ($166_{A,0}$), action$_{A,1}$ ($166_{A,1}$), and action$_{A,J}$ ($166_{A,J}$), library$_B$ ($162_B$) is shown with a plurality of actions, including action$_{B,0}$ ($166_{B,0}$), action$_{B,1}$ ($166_{B,1}$), and action$_{B,K}$ ($166_{B,K}$), and library$_N$ ($162_N$) is shown with a plurality of actions, including action$_{N,0}$ ($166_{N,0}$), action$_{N,1}$ ($166_{N,1}$), and action$_{N,L}$ ($166_{N,L}$). In an embodiment, each library contains the same quantity of actions, e.g. J=K=L. Similarly, in an embodiment, each library may contain a different quantity of actions, e.g. J≠K≠L.

Each agent has an operatively coupled replay buffer. As shown herein, agent$_A$ ($164_A$) is operatively coupled to replay buffer$_A$ ($168_A$), agent$_B$ ($164_B$) is operatively coupled to replay buffer$_B$ ($168_B$), and agent$_N$ ($164_N$) is operatively coupled to replay buffer$_N$ ($168_N$). Each individual replay buffer is shown herein operatively coupled to the corresponding library. In an embodiment, the individual replay buffers may be embedded in the corresponding library. Each replay buffer is shown populated with or containing a plurality of tuples. As shown replay buffer$_A$ ($168_A$) is shown with tuple$_{A,0}$ ($170_{A,0}$), tuple$_{A,1}$ ($170_{A,1}$), and tuple$_{A,2}$ ($170_{A,2}$), replay buffer$_B$ ($168_B$) is shown with tuple$_{B,0}$ ($170_{B,0}$), and replay buffer$_N$ ($168_N$) is shown with tuple$_{N,0}$ ($170_{N,0}$) and tuple$_{N,1}$ ($170_{N,1}$). Each tuple represents or contains data that is the result from a multi-agent interaction, and is described in detail below. Accordingly, each tuple contains a policy vector representing an evaluation for each action present in the corresponding library. The process for creating and saving tuples and for creating policy vectors is described in detail in FIG. 3.

The AI platform (150) is shown herein with tools to support populating one or more replay buffers with tuples generated during agent interaction, and to leverage the populated replay buffers to train a neural network. The AI platform (150) tools are shown herein as an interaction manager (152), a training manager (154), and a language manager (156). The tools (152), (154), and (156) are operatively coupled, directly or indirectly, and provide the functions, as described below.

The interaction manager (152) supports and enables communications between two or more agents, e.g. Agent$_A$ ($164_A$) and Agent$_B$ ($164_B$). As shown and described in FIG. 3, the operatively coupled agents transmit and receive natural language. More specifically, a first agent transmits natural language to a second agent, which in turn generates corresponding natural language output from an operatively coupled library of actions. The interaction manager (152) populates the replay buffer for each of the corresponding agents involved in the communication. The separate replay buffers are limited to the actions in the respective libraries. For example, following a set of interactions between $Agent_A$ ($164_A$) and $Agent_B$ ($164_B$), the interaction manager (152) creates a tuple for each of the agents, e.g. $tuple_{A,0}$ ($170_{A,0}$) for $Agent_A$ ($164_A$) and $tuple_{B,0}$ ($170_{B,0}$) for $Agent_B$ ($164_B$). Each tuple reflects the interaction and the corresponding actions for the respective agents. More specifically, each tuple entry in the replay buffers includes an input action, a policy vector, an action produced in response to the input action, and a reward. The interaction manager (152) stores the created tuples, e.g. $tuple_{A,0}$ ($170_{A,0}$) and $tuple_{B,0}$ ($170_{B,0}$), in the respective replay buffer. As shown by way of example, $tuple_{A,0}$ ($170_{A,0}$) is stored in $replay\ buffer_A$ ($168_A$) and $tuple_{B,0}$ ($170_{B,0}$) is stored in $replay\ buffer_B$ ($168_B$).

As shown, the training manager (154) is operatively coupled to the interaction manager (152). The training manager (154) functions to train one or more neural networks, i.e., agents ($164_A$), ($164_B$), and ($164_N$). The training manager (154) interfaces with the interaction manager (152) to explore the communications between the two or more agents. The training manager (154) randomly selects one or more tuples from a corresponding replay buffer. From the selected one or more tuples, the training manger (154) randomly selects an action from the distribution of actions associated with the policy vector in the tuple. In an embodiment the training manager (154) selects the action for sampling through a random choice function. The sampled action is from the distribution of actions in the corresponding library. The action selected as a sample by the training manager (154) functions as input to the operatively coupled agent, e.g. neural network, which produces an output value corresponding to the sampled action. The output value is a proximity value indicating the proximity of the sampled action to the input action. The output value is compared to the value of the action from the policy vector represented in the tuple. The training manager (154) leverages the output value in view of the input action and calculates a gradient to represent any differences between the sampled action and the input action. More specifically, the gradient represents a distance between a proximity value of the sampled action and the proximity value of the action as represented in the vector from the tuple. Accordingly, the training manager (154) leverages the operatively coupled agent to assess proximity of one or more actions represented in the policy vector with respect to the input action.

The training manager (154) applies the calculated gradient to adjust the weights in the neural network, e.g. agent. The application of the gradient to the neural network effectively creates an updated neural network corresponding to the gradient, which in an exemplary embodiment will increase efficiency in NL processing. In an exemplary embodiment, the agent is subject to modification in view of the gradient until such time as a convergence between two or more gradients is identified. To support and enable identification of convergence, the training manger (154) selects a second action for sampling from the policy vector of the corresponding tuple in the replay buffer, calculates a second gradient associated with the second sampled action, and applies the second gradient to further train the corresponding agent. The training manager (154) compares the first and second gradients to identify any distance between the gradients. A convergence of the gradients is followed by concluding sampling actions and modification of the corresponding agent. In an exemplary embodiment, the training manager (154) continues to randomly select actions for sampling until a convergence of the gradients is identified. Accordingly, the training manager (154) samples actions from the distribution in a select or designated tuple in the replay buffer, and assessing a corresponding agent for application to the operatively coupled agent.

As shown, the language manager (156) is operatively coupled to both the interaction manager (152) and the training manager (154). The language manager (152) functions to evaluate natural language (NL) input and identify an action corresponding to the received NL input. The language manager (156) evaluates the received NL input to determine natural language components, i.e. recognize words, phrases, etc. The language manager (156) processes the evaluated components, and determines an output action corresponding to the received natural language input. The language manager (156) then applies the trained neural network to execute the identified action. Accordingly, the language manager (156) receives and evaluates NL input to identify the output action associated with the received NL input, and leverages the neural network to execute the identified associated action.

In some illustrative embodiments, server (110) may be the IBM Watson® system available from International Business Machines Corporation of Armonk, New York, which is augmented with the mechanisms of the illustrative embodiments described hereafter. The interaction manager (152), the training manager (154), and the language manager (156) hereinafter referred to collectively as AI tools, are shown as being embodied in or integrated within the AI platform (150) of the server (110). In one embodiment, the AI tools may be implemented in a separate computing system (e.g., 190) that is connected across network (105) to the server (110). Wherever embodied, the AI tools function to support populating one or more knowledge bases with tuples generated during agent interactions, and to leverage the populated knowledge bases to train a neural network.

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store (182a). The nonvolatile data store ($182_A$) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 2:
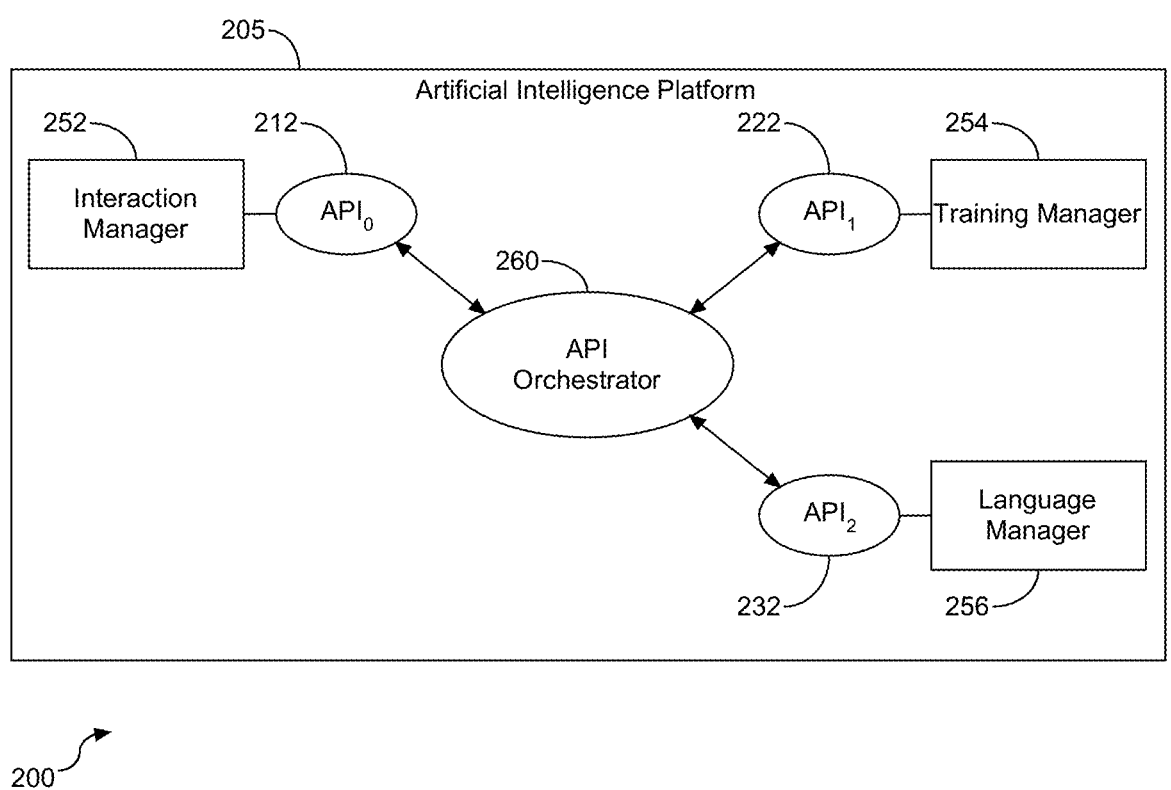
FIG. 2 depicts a block diagram illustrating the AI platform tools, as shown and described in FIG. 1, and their associated application program interfaces (APIs).

An Application Program Interface (API) is understood in the art as a software intermediary between two or more applications. With respect to the artificial intelligence platform (150) shown and described in FIG. 1, one or more APIs may be utilized to support one or more of the tools (152), (154), and (156) and their associated functionality. Referring to FIG. 2, a block diagram (200) is provided illustrating the tools (152), (154), and (156) and their associated APIs. As shown, a plurality of tools are embedded within the artificial intelligence platform (205), with the tools including the interaction manager (252) associated with $API_0$ (212), the training manager (254) associated with $API_1$ (222), and the language manager (156) associated with $API_2$ (232). Each of the APIs may be implemented in one or more languages and interface specifications.

As shown, $API_0$ (212) is configured to support and enable the functionality represented by the interaction manager (252). $API_0$ (212) provides functional support to communications between two or more agents; $API_1$ (222) provides functional support to train a neural network operatively coupled to a knowledge base populated with a set of terms; and $API_2$ (232) provides functional support to evaluate natural language (NL) input and to leverage the trained neural network to identify an action corresponding to the received NL input. As shown, each of the APIs (212), (222), and (232) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
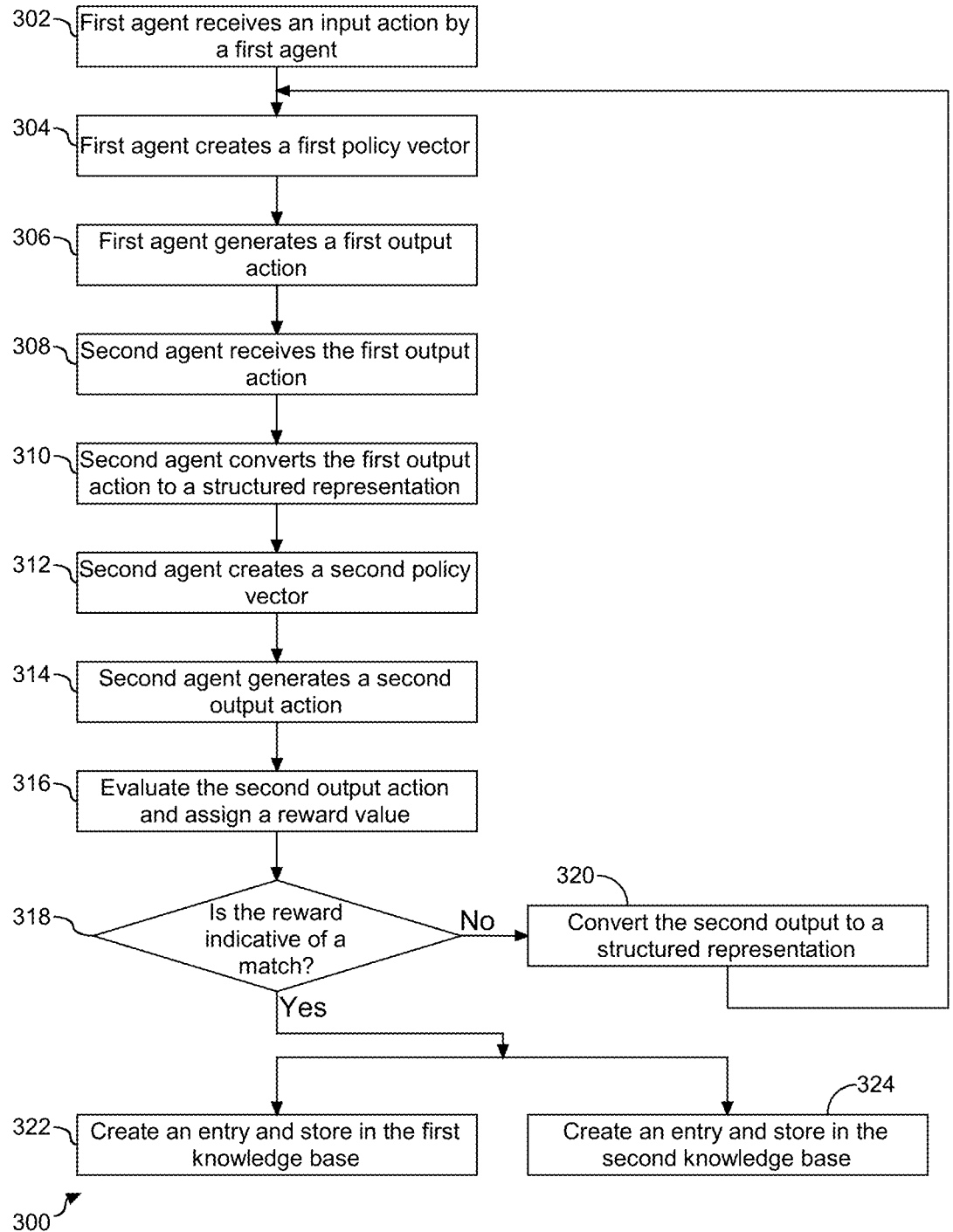
FIG. 3 depicts a flow chart illustrating a process for populating replay buffers with generated tuples through agent interaction.

Referring to FIG. 3, a flow chart (300) is provided illustrating a process for training a neural network to understand and interpret natural language (NL). The process encompasses an interaction between two agents, with each agent configured to support natural language processing (NLP). In an exemplary embodiment, each agent is a computer system operatively coupled to a corresponding neural network configured to support NLP, or in an embodiment, each agent is a neural network configured to support NLP. As shown in FIG. 1, each agent is operatively coupled to a knowledge base having a corresponding distribution of actions, or in another embodiment is a collection or distribution of terms. As shown herein, an input action is received or designated by a first agent, $Agent_0$ (302). The input action is local to the first agent and is not shared or otherwise revealed with an operatively coupled agent, such as the second agent, $Agent_1$ ($162_1$), or any other agents, such as $Agent_N$ ($162_N$). In an exemplary embodiment, the input action represents an origin for the interaction between two or more agents. The input action may be an action present within a first distribution of actions in a knowledge base local or operatively coupled to the first agent, e.g. first knowledge base, or it may be received from a computing device in communication with the first agent across a network connection.

Responsive to receiving the input term, the first agent creates a policy vector, vector $D_0$ (304). The policy vector, vector $D_0$, is also referred to as a first policy vector and is local to the first agent as it corresponds to an evaluation of the actions in the first knowledge base relative to the input action. More specifically, the policy vector creation at step (304) represents an assessment wherein a value assigned to each action in the first distribution of actions and indicates a relationship between each action represented in the first knowledge base and the input action. In an exemplary embodiment, the relationship functions as an indicator representing proximity of each individual action in the first knowledge base relative to the received input action. Accordingly, each action in the first knowledge base is assessed with respect to the received input action.

The proximity assessment at step (304) facilitates identification of one or more actions within the first knowledge base and their individual proximity to the input action, as well as identification of one or more actions within the first knowledge base that are distal from the input action. In an exemplary embodiment, an action within the first knowledge base determined to be closely related to the input action, e.g. proximally positioned relative to the input action, will have a higher proximity value in comparison to an action determined to be un-related or distal from the input action. The first agent leverages the first policy vector, vector $D_0$, to generate output from the first distribution of actions in the form of a first output action related to the input action (306). In an exemplary embodiment, the generated first output is the output action selected from the first distribution that is closest in proximity to the input action. In an embodiment, the generated first output action is referred to as a clue or a responsive action, such as, but not limited to, an answer or a response to the input action. Similarly, in an exemplary embodiment, the generated first output action is in a natural language (NL) format. Accordingly, the first agent receives an input action, generates a first policy vector based on the input action, and leverages the policy vector to generate the first output action.

Following the generation of the first output action by the first agent at step (306), the first output action is received by a second agent, $Agent_1$, operatively coupled to the first agent, $Agent_0$ (308). As shown in FIG. 1 and similar to the configuration of the first agent, the second agent has an operatively coupled second knowledge base or second library containing a distribution of second actions. Unlike the first agent, the second agent is not privy to the input action. As such, the input action is not revealed or otherwise disclosed to the second agent. In response to receiving the first output action at step (308), the second agent converts the first output action to a structured representation (310) and creates a second policy vector, $D_1$, (312) which effectively assigns a value to each action in the second knowledge base, with the assigned value indicating a relationship between each action in the second knowledge base and the received first output action. The second agent leverages the second policy vector, vector $D_1$, to generate a second output action related to the received first output action (314). In an exemplary embodiment, the generated output at step (314) is an action selected from the second distribution that is closest in proximity to the first output action received at step (308). In an embodiment, the generated output at step (314) is referred to as a second clue or a second action, such as, but not limited to, an answer or a response to the first output action. Similarly, in an exemplary embodiment, the generated second output action is in a natural language (NL) format. Accordingly, the second agent, $Agent_1$, receives a first output action, generates a second policy vector, and leverages the second policy vector to generate the second output action.

Following step (314), the second output action is evaluated relative to the input action to identify or assess a reward value (316). In an exemplary embodiment, the reward value is scalar and identifies if the second output action matches the input term. For example, in an exemplary embodiment, a reward value of 0 is indicative that the second output action does not match the input action, while a reward value of 1 is indicative that the second output action matches the input action. Following step (316), an assessment is conducted to determine if the reward is indicative of a match between the second output action and the input action, e.g. scalar value of 1, (318). A negative response to the assessment at step (316) is followed by transmission of the second output action to the first agent, $Agent_0$, which converts the second output action to a structured representation (320), followed by a return to step (304) to update the first policy vector, $D_0$. Accordingly, the first and second agents generate first and second output actions, respectively, from their respective knowledge bases responsive to their corresponding first and second policy vectors.

As shown, a positive response to the determination at step (318) indicates that the second output action selected by the second agent, $Agent_1$, matches the first output action selected or generated by the first agent. Following a positive response to step (318), an entry is created and stored in the first knowledge base (322). In an embodiment, the first knowledge base is referred to as a replay buffer. The entry in the first knowledge base created at step (322) is saved as tuple <s, $D_0$, s', r> wherein s is the input action, $D_0$ is the first policy vector associated with the first agent, s' is an array or compilation of the first and second output actions, i.e. the output actions generated by the first and second agents, respectively, throughout the interactions and corresponding processes, and r is the calculated reward value. Concurrent or sequential to step (322), a corresponding entry is stored in the second knowledge base, or second replay buffer associated with the second agent, $Agent_1$, (324). The entry saved in the second knowledge base at step (324) is saved as tuple <s, $D_1$, s', r>. Following the entry of tuples into the corresponding first and second knowledge bases at steps (322) and (324), respectively, the interaction between the agents and the corresponding processes concludes. The process shown herein and interaction between the first and second agents may be repeated for a new input action followed by creation and storage of a subsequent tuple, <s, $D_0$, s', r>, for the new input action. Accordingly, responsive to generation of an output action by the second agent that matches the input action from the first agent, a tuple is saved in the first and second knowledge bases, with the tuple(s) capturing the input and output actions of the first and second agents in relation to the corresponding input term.

Figure 4:
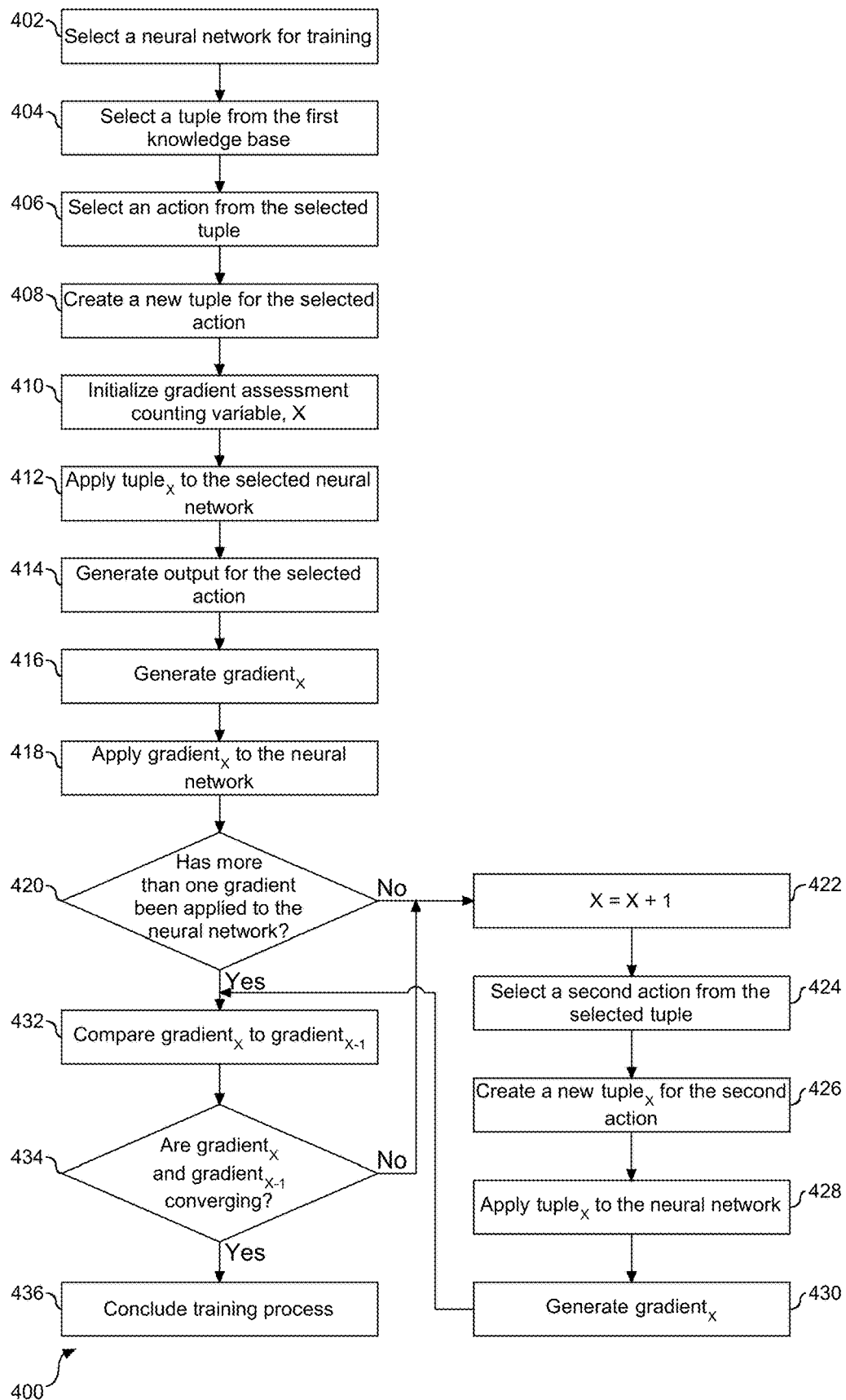
FIG. 4 depicts a flow chart illustrating a process for utilizing the tuples generated during the agent interaction, as shown and described in FIG. 3, to train a neural network for natural language processing.

The process shown and described in FIG. 3, populates the corresponding knowledge bases, or in an embodiment corresponding replay buffers, with tuples reflecting the evolution of actions from interaction between the first and second agents. Referring to FIG. 4, a flow chart (400) is provided illustrating a process for utilizing the tuples generated during the agent interaction, as shown and described in FIG. 3, to train a neural network for natural language processing (NLP). As shown, a neural network is selected for training (402). In an embodiment, the selected neural network is local or operatively coupled to the first or second agent. Similarly, in an embodiment, the selected neural network is local or operatively coupled to an agent not previously utilized in the process shown in FIG. 3. A tuple entry is selected from the first knowledge base associated with the first agent, $Agent_0$ (404). The selection or designation of the first agent is shown for exemplary purposes. In an embodiment, tuples from any agent that participated in the process shown in FIG. 3 may be selected. In an embodiment, multiple tuple entries are selected from the designated agent. In an exemplary embodiment, the selection of one or more tuples at step (404) is random. Following step (404) an action is selected from the distribution of actions associated with vector $D_0$ in the selected tuple(s) (406). In an exemplary embodiment, a random choice function is employed to select the action at step (406). The randomly selected action is leveraged to create a new tuple for evaluation by the selected neural network (408). The new tuple is stored as <s, a', s', and r> wherein s, s', and r are the same values as represented in the tuple selected at step (404), and a' is the randomly selected action from the distribution, D.

Following step (408), a gradient assessment counting variable, X, is initialized (410). The newly created tuple, $tuple_X$, is applied to the selected neural network (412). In an embodiment, the application of $tuple_X$ is referred to as a sampling. The selected neural network calculates, or in an embodiment generates, output for the sampled term, a' (414). The output from step (414) is compared to the value of the sampled term, a' in the corresponding policy, $D_0$, with the comparison generating a gradient, e.g. $gradient_X$, (416), corresponding to the sampled action. $Gradient_X$ represents a spatial difference between the sampled action and the neural network output. The gradient, e.g. $gradient_X$, is applied to the neural network to adjust one or more corresponding weights (418). The application of the gradient to the neural network effectively creates an updated neural network to adjust one or more weights corresponding to the gradient, which in an exemplary embodiment will increase efficiency in NL processing. Following step (418) a determination is made if more than one gradient has been calculated and applied to the neural network (420). If the response to the determination is negative, the gradient assessment counting variable, X, is incremented (422) and another action is selected, e.g. randomly selected, from the distribution of actions associated with the policy vector, e.g. $D_0$, in the selected tuple(s) (424). Similar to step (406), in an exemplary embodiment, a random choice function is employed to select the action at step (422). The randomly selected action is leveraged to create a new tuple for evaluation by the selected neural network (426). The new tuple is stored as <s, a', s', and r> wherein s, s', and r are the same values as represented in the tuple selected at step (404), and a' is the randomly selected action from the distribution, $D_0$, at step (424). The newly created tuple, $tuple_X$, is applied to the selected neural network (428), which generates output. The output from step (428) is compared to the value of the sampled term, a' in the corresponding policy, $D_0$, with the comparison generating a gradient, e.g. $gradient_X$, (430), corresponding to the sampled action. $Gradient_X$ represents a spatial difference between the sampled action and the neural network output.

Following a positive response to the assessment at step (420) or following the generation of the gradient at step (430), an assessment of gradients is conducted to ascertain convergence therein. As shown, an assessment of the corresponding gradients, e.g. $gradient_X$ and $gradient_{X-1}$, is conducted (432) and it is determined whether gradient$_X$ and gradient$_{X-1}$ are converging (434). A negative response to the determination at step (434) indicates that the neural network requires further training, as shown herein by a return to step (422). Similarly, a positive response to the determination at step (434) indicates that the neural network has been trained and the process concludes (436). The indication of a gradient convergence concludes the evaluation of the neural network, effectively creating a new neural network configured to efficiently and accurately process natural language. Accordingly, the neural network is trained though random action sampling until a gradient convergence is identified.

Figure 5:
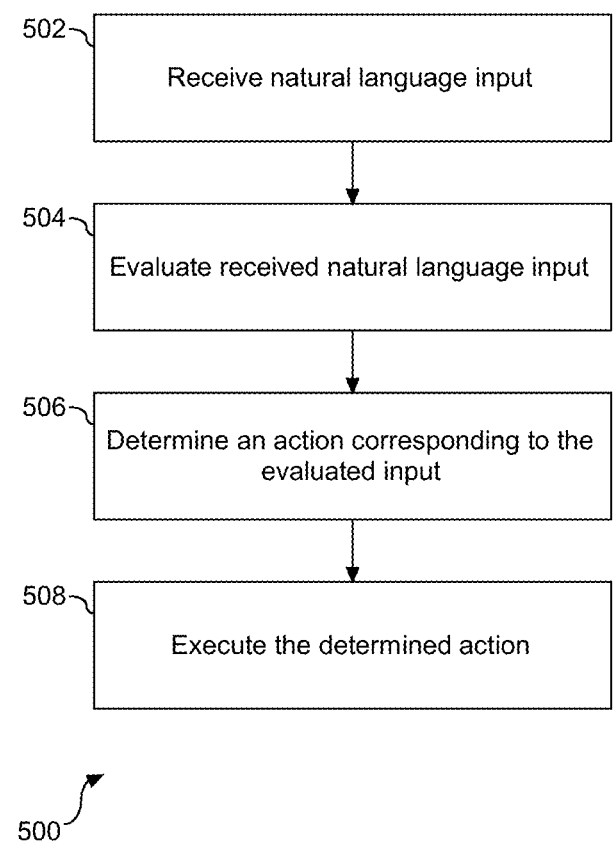
FIG. 5 depicts a flow chart illustrating a process for applying the trained neural network to execute an identified action responsive to receipt of natural language input.

As shown and described in FIG. 4, the neural network is trained using the populated knowledge base from FIG. 3. The goal is to leverage the evolved neural network for natural language processing. Referring to FIG. 5, a flow chart (500) is provided illustrating a process for applying the trained neural network to execute an identified action responsive to receipt of natural language input. As shown, the trained neural network form FIG. 4 receives natural language input (502). For example, the neural network might receive the phrase "I want food delivered for dinner" as natural language input. The neural network evaluates the received natural language input to determine natural language components, i.e. recognize words, phrases, etc. (504). The neural network processes the evaluated components, and determines an action corresponding to the received natural language input (506). For example, in response to receiving the input "I want food delivered for dinner," the neural network may identify a restaurant that delivers food in the evening. The neural network then executes the identified action, i.e., the neural network executes an action to order food for delivery at a specific time to a corresponding physical location (508). The convergence of the gradients and the evolution of the network reflect efficient and accurate processing of the received natural language input.

Aspects of utilizing tuples generated during agent interaction to train a neural network for natural language processing are shown and described with the tools and APIs shown in FIGS. 1 and 2, respectively, and the processes shown in FIGS. 3, 4, and 5. Aspects of the functional tools (152), (154), and (156) and their associated functionality may be embodied in a computer system/server in a single location, or in one embodiment, may be configured in a cloud-based system sharing computing resources. With references to FIG. 6, a block diagram (600) is provided illustrating an example of a computer system/server (602), hereinafter referred to as a host (602) in communication with a cloud-based support system, to implement the processes described above with respect to FIGS. 3-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
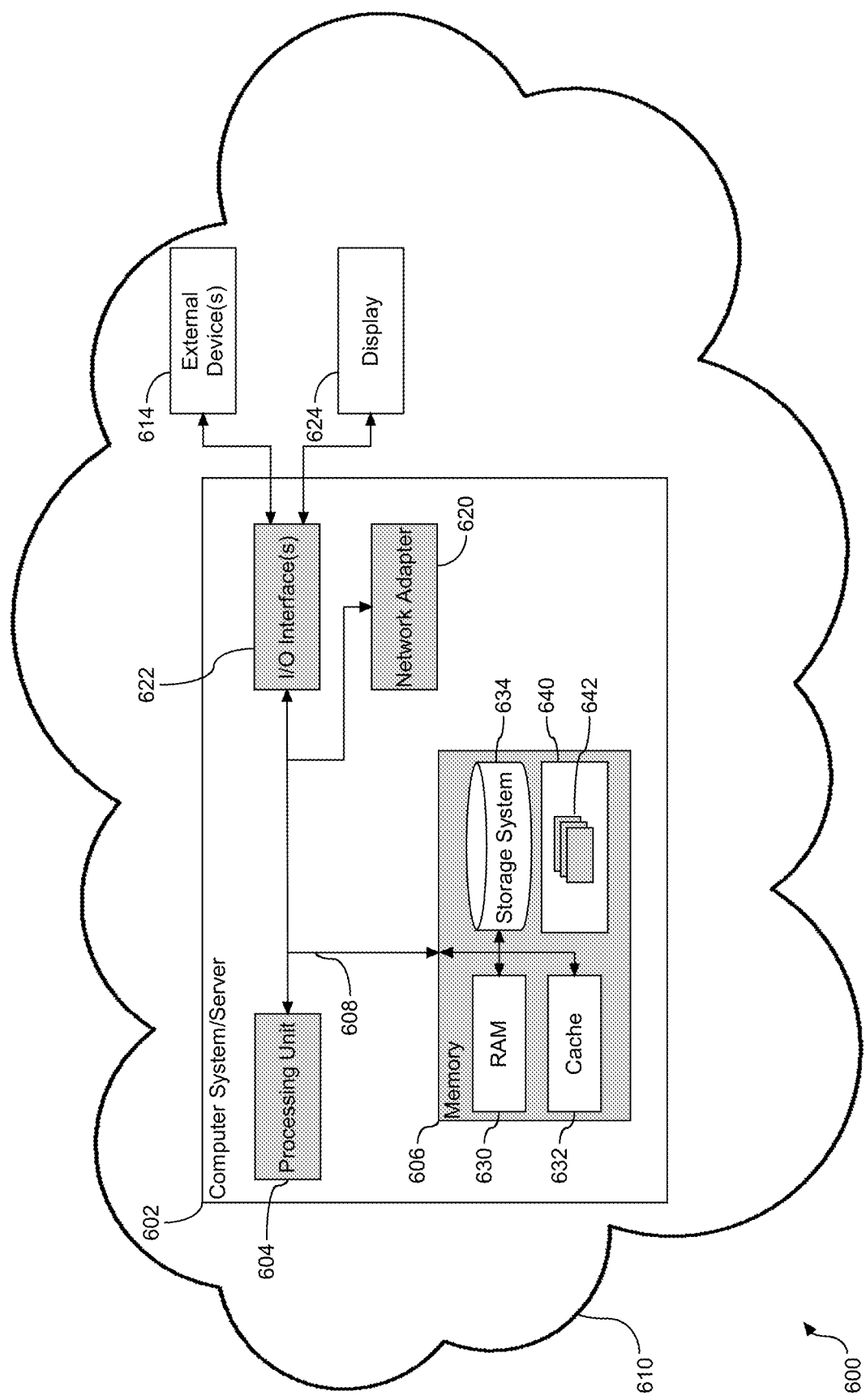
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processing unit (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to support and enable reinforcement learning through random action replay for natural language (NL). For example, the set of program modules (642) may include the tools (152) and (154) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
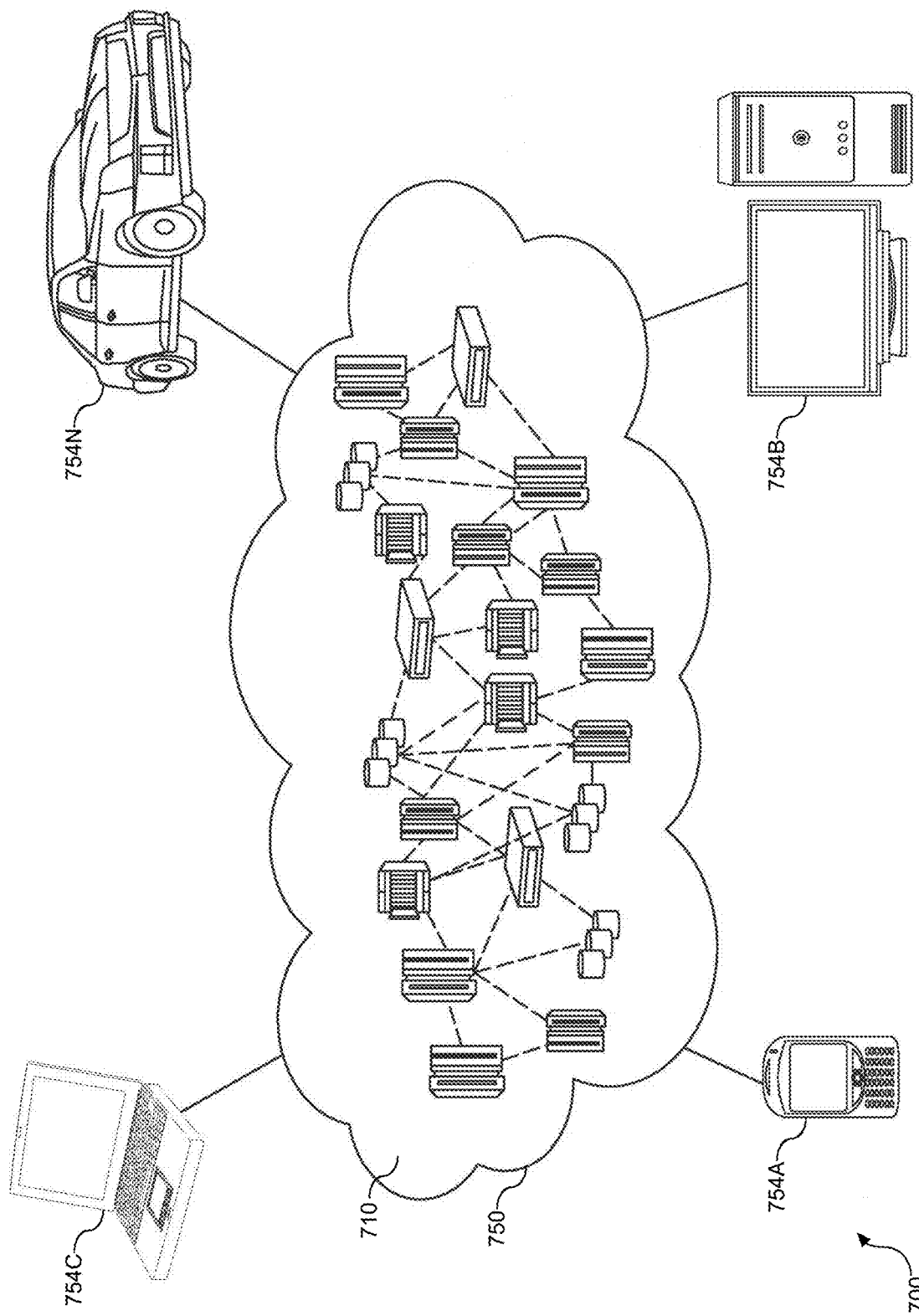
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
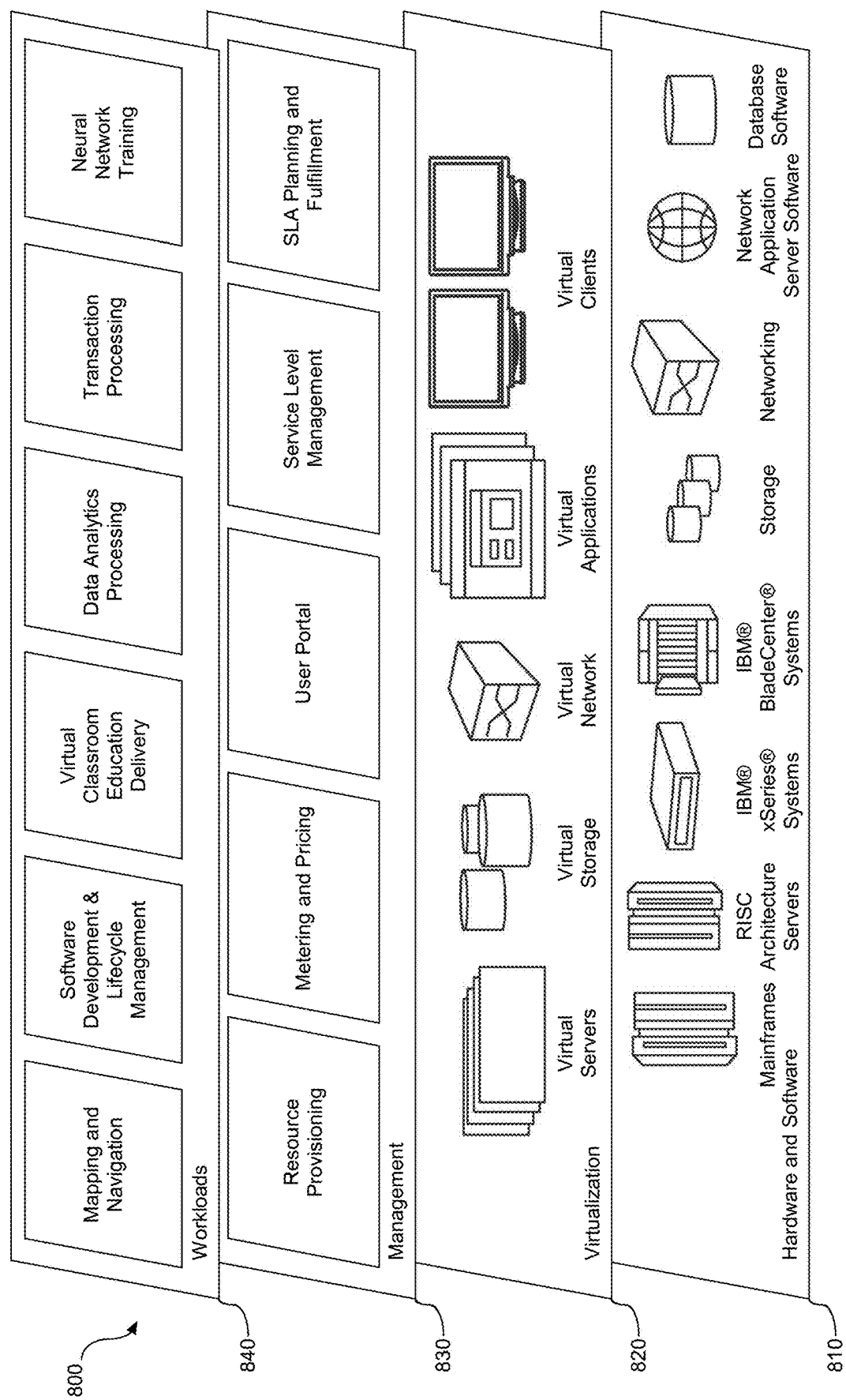
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and neural network training.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of an AI platform to utilize tuples generated during agent interactions to train a neural network for natural language processing.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, natural language processing may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
 a processing unit operatively coupled to memory;
 an artificial intelligence (AI) platform operatively coupled to the processing unit, the AI platform configured with one or more tools to support random action replay for natural language (NL) learning, the one or more tools comprising:
  a training manager configured to train a neural network, the training further comprising the training manager to:
   explore a NL conversation, the exploration to leverage one or more tuples associated with the NL conversation, each tuple representing at least an input action, an output action, a policy vector, and a reward value;
   select a tuple and sample a first action, from a distribution of actions, associated with the selected tuple;
   assess the sampled first action, including generate output associated with the assessment, compare the generated output to a value of the sampled first action corresponding to the policy vector and, based on the comparison, calculate a first gradient representing a distance of the generated output from the sampled first action in the selected tuple associated with the NL conversation; and apply the first gradient to selectively adjust the neural network;

a language manager operatively coupled to the training manager, the language manager configured to receive and apply NL input to the selectively adjusted neural network, and generate a NL output corresponding to the received NL input; and the language manager configured to execute an identified action corresponding to the identified output.

2. The computer system of claim 1, further comprising an interaction manager operatively coupled to the training manager, the interaction manager configured to create the one or more tuples in an interactive environment with corresponding first and second agents, the interactive environment to identify one or more actions from the distribution of actions as a response to receipt of the input action.

3. The computer system of claim 1, further comprising the training manager configured to re-train the neural network and incorporate a sampled second action from the distribution of actions, calculate a second gradient representing a distance of the sampled second action from the input action, and apply the second gradient to selectively adjust the neural network.

4. The computer system of claim 3, further comprising the training manager configured to assess the first and second gradients, and responsive to identification of a convergence of the first and second gradients the training manager further configured to terminate training of the neural network.

5. The computer system of claim 1, further comprising the training manager configured to utilize a random choice function to select the first action from the distribution of actions for sampling.

6. The computer system of claim 1, wherein the trained neural network is configured to evaluate the received NL input and to determine one or more NL components of the evaluated NL input.

7. The computer system of claim 6, further comprising the trained neural network configured to evaluate the determined one or more NL components and determine an action corresponding to the received NL input.

8. A computer program product comprising a computer readable storage medium having program code embodied therewith, the program code executable by a processor to:

train a neural network, the training further comprising the program code to:

explore a natural language (NL) conversation, the exploration to leverage one or more tuples associated with the NL conversation, each tuple representing at least an input action, an output action, a policy vector, and a reward value;

select a tuple and sample a first action, from a distribution of actions, associated with the selected tuple;

assess the sampled first action, including generate output associated with the assessment, compare the generated output to a value of the sampled first action corresponding to the policy vector and, based on the comparison, calculate a first gradient representing a distance of the generated output from the sampled first action in the selected tuple associated with the NL conversation; and apply the first gradient to selectively adjust the neural network;

receive and apply NL input to the selectively adjusted neural network, and generate a NL output corresponding to the received NL input; and execute an identified action corresponding to the identified output.

9. The computer program product of claim 8, further comprising the program code executable by the processor to create the one or more tuples in an interactive environment with corresponding first and second agents, the interactive environment to identify one or more actions from the distribution of actions as a response to receipt of the input action.

10. He computer program product of claim 8, further comprising the program code executable by the processor to re-train the neural network and incorporate a sampled second action from the distribution of actions, calculate a second gradient representing a distance of the sampled second action from the input action; and apply the second gradient to selectively adjust the neural network.

11. The computer program product of claim 10, further comprising the program code executable by the processor to assess the first and second gradients, and responsive to identification of a convergence of the first and second gradients terminate training of the neural network.

12. The computer program product of claim 8, further comprising the program code executable by the processor to utilize a random choice function to select the first action from the distribution of actions for sampling.

13. A computer implemented method comprising:

training a neural network, the training further comprising:

exploring a natural language (NL) conversation, the exploration to leverage one or more tuples associated with the NL conversation, each tuple representing an input action, an output action, a policy vector, and a reward value;

selecting a tuple and sampling a first action, from a distribution of actions, associated with the selected tuple;

assessing the sampled first action, including generate output associated with the assessment, compare the generated output to a value of the sampled first action corresponding to the policy vector and, based on the comparison, calculate a first gradient representing a distance of the generated output from the sampled first action in the selected tuple associated with the NL conversation; and applying the first gradient to selectively adjust the neural network;

receiving and applying NL input to the selectively adjusted neural network, and generating a NL output corresponding to received NL input; and executing an identified action corresponding to the identified output.

14. The method of claim 13, further comprising creating the one or more tuples in an interactive environment with corresponding first and second agents, the interactive environment to identify one or more actions from the distribution of actions as a response to receipt of the input action.

15. The method of claim 13, further comprising re-training the neural network and incorporating a sampled second action from the distribution of actions, calculating a second gradient representing a distance of the sampled second action from the input action, and applying the second gradient to selectively adjust the neural network.

16. The method of claim 15, further comprising assessing the first and second gradients, and responsive to identification of a convergence of the first and second gradients terminating training of the neural network.

17. The method of claim 13, further comprising utilizing a random choice function to select the first action from the distribution of actions for sampling.

* * * * *